United States Patent

[11] 3,582,088

[72] Inventors Tadayoshi Matsuzaki;
Yukihisa Fukumoto, both of Tokyo, Japan
[21] Appl. No. 745,291
[22] Filed July 16, 1968
[45] Patented June 1, 1971
[73] Assignee Nippon Electric Company, Limited
Tokyo, Japan
[32] Priority July 25, 1967
[33] Japan
[31] 42/47771

[54] SEALING APPARATUS
12 Claims, 1 Drawing Fig.
[52] U.S. Cl. ............................................. 277/3,
277/59, 277/27, 220/46
[51] Int. Cl. ....................................... F16r 41/00,
F16j 15/00
[50] Field of Search ............................. 277/59, 3,
73, 27, 29; 220/46 P

[56] References Cited
UNITED STATES PATENTS
719,460  2/1903  Goosmann ................... 277/3
2,085,777  7/1937  Williams ....................... 277/3
3,328,039  6/1967  McKeough ................... 277/3
FOREIGN PATENTS
1,237,219  12/1960  France ......................... 277/3

Primary Examiner—Samuel B. Rothberg
Attorney—Marn & Jangarathis

ABSTRACT: Sealing apparatus is provided wherein differential piston means is relied upon to distribute and apportion among each of the individual seals thereof, the external pressure applied to the high-pressure seal therein. In one embodiment of such apparatus, differential piston means may be positioned between each pair of individual seals present in the sealing apparatus and thereby acts to apply a back pressure to the high-pressure seal of the pair to thereby reduce the pressure thereon while the remaining external pressure is applied to the second seal of the pair. Thus, each seal present in sealing apparatus according to this invention shares the applied pressure load.

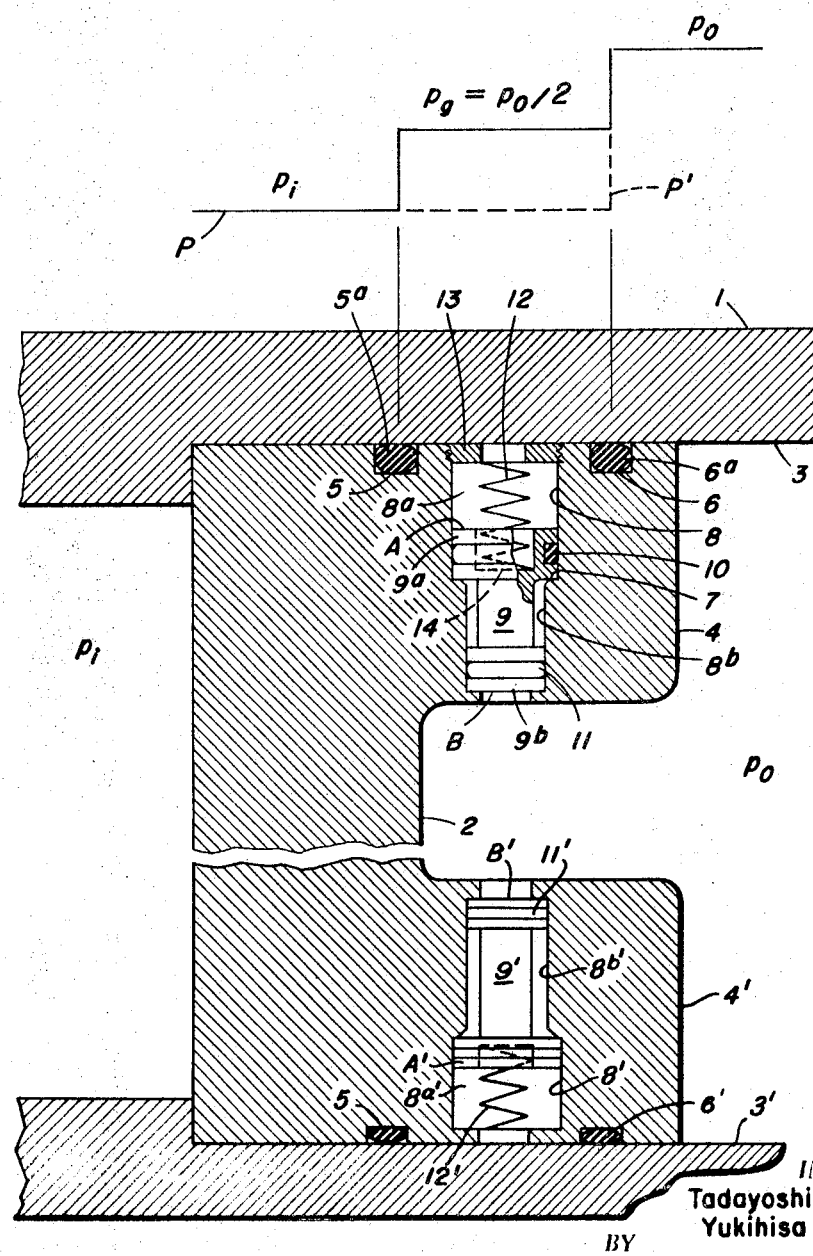

SEALING APPARATUS

This invention relates to sealing apparatus and more particularly to sealing apparatus which acts to improve the sealing effect between a main body and a secondary body mounted therein or thereon.

Although the invention is not limited to uses with any particular apparatus or in conjunction with any specified combination, a typical application of one embodiment of this invention relates generally to sealing apparatus for a pressureproof vessel. Accordingly, the invention will be disclosed wherein an embodiment of the sealing apparatus thereof is used to improve the sealing effect between the main body of a pressureproof vessel and a cover plate mounted therein; however, it should be apparent at the outset that this invention finds a wide ambit of use whenever it is necessary or expedient to effect a sealed relationship between a main body and a secondary body mounted therein.

Present day apparatus for effecting a sealed relationship between a pressureproof vessel and a circular cover plate fitted in a cylindrical opening of the vessel conventionally takes the form of a plurality of annular seals, such as O-rings, mounted in several axially spaced parallel grooves formed about the periphery of the cover plate. However, in the sealed relationship effected thereby, the O-ring nearest to the pressure medium acts substantially alone in providing the sealed relationship while the remainder of the O-rings included in such apparatus serve only as auxiliary seals which have little or no sealing effect unless or until said O-ring nearest the pressure medium breaks down or fails. Thus, despite the use of a plurality of seals in such apparatus, no substantial improvement in sealing performance is obtained regardless of the number of seals used in such apparatus. Furthermore, where such conventional apparatus is used under load conditions wherein the exerted pressure exceeds the limit prescribed for the O-rings, the performance obtained from such conventional sealing apparatus is much the same as if only a single O-ring was relied upon. Thus, it will be seen that conventional, prior art sealing apparatus makes no provision for dispersing the applied pressure so that each seal included therein may equally share the pressure load applied to the sealing apparatus.

Therefore, it is an object of this invention to provide long lasting sealing apparatus that disperses the pressure applied to each sealing means therein which apparatus may be used in conjunction with devices which need not be machined to a high tolerance due to the virtues of said sealing apparatus.

Various other objects and advantages of the invention will become clear from the following detailed description of an exemplary embodiment described herein, and the novel features will be particularly pointed out in connection with the appended claims.

In accordance with the invention, sealing apparatus which acts to improve the sealing effect between a main body and a secondary body mounted therein or thereon is provided wherein one or more differential piston means is utilized to apply a reduced fluid pressure to the area interposed between adjoining sealing means on the engaging face to thereby distribute and disperses the pressure to which the sealing apparatus is subjected so that each sealing means shares in bearing the exerted pressure. The invention will be more clearly understood by reference to the following detailed description of an exemplary embodiment thereof in conjunction with the accompanying drawing, which is a sectional view of one embodiment of the sealing apparatus of the present invention.

Referring now to the drawing, there is shown an exemplary embodiment of the sealing apparatus according to the present invention. The apparatus depicted in the drawing includes a portion of a sectional view of the main body of a pressureproof vessel 1 and a circular cover plate 2 adapted as shown to be fitted into a cylindrical opening 3 of the main body of the pressureproof vessel 1. The circular cover plate 2 includes a thickened portion 4 along the periphery thereof and a plurality of annular U-shaped grooves shown for instance as 5 and 6, formed in the peripheral face of said cover plate 2. Each of said annular U-shaped grooves 5 and 6 is adapted to have a sealing means, shown as O-rings 5a and 6a, mounted therein to thereby effect a seal between the peripheral face of said cover plate 2 and the cylindrical opening 3 of the main body of the pressureproof vessel 1.

The thickened portion 4 of the circular cover plate 2 has formed therein one or more cylinders 8, 8; each of which has its major axis along the radial direction of the cover plate 2, and additionally includes an annular shoulder 7 formed therein. The cylinders thus formed may, therefore, be considered as being of two portions wherein a first portion comprises a large diameter bore 8a and the second portion thereof comprises a small diameter bore 8b. A differential piston 9, 9' is slidably mounted within said corresponding cylinders 8 or 8 and comprises a first large portion 9a and a second small portion 9b. As is apparent from the FIG., the first and second piston portions 9a and 9b are consonant in size with said first and second cylinder bore portions 8a and 8b, respectively, and adapted to fit tightly therein. Both the first and second piston portions, 9a and 9b which are integrally formed with each other, have mounted therein, in the usual manner, suitable piston rings 10 and 11, respectively. The distal end of the large bore portion 8a of the cylinder 8 opens to the inner periphery of cylinder opening 3 of the main body of the pressureproof vessel 1 at a point intermediate the annular seals 5a and 6a while the inner distal end of the small cylinder bore portion 8b is in fluid communication with the exerted external Po.

The portion of the cylinder bore defined by the walls of the cylinder bore large portion 8a, the end face A of the large portion 9a of piston 9 and the communicating surface of cylindrical opening 3 of the main body of the pressureproof vessel 1 is filled with a pressure communicating fluid having low compressibility. The pressure communicating fluid is protected from the possible adverse effect of the outside fluid surrounding the pressureproof vessel 1 and the cover plate 2 by the piston rings 10 and 11. A coil spring 12 is mounted within the previously defined portion of the cylinder bore so as to prevent the upward motion of the piston 9 during the assembly of the pressureproof vessel 1 and the cover plate 2. The coil spring 12 is secured at a first end thereof to a ring 13 screwed into the outer end of said cylinder. The second end of said coil spring 12 is seated in a recess 14 formed on the end face of the large portion 9a of the piston 9. The coil spring 12 should be selected such that the force exerted thereby is sufficiently small when compared to the opposing force of the outside pressure as exerted on the piston 9.

When the apparatus depicted in the FIG. is assembled as shown and exposed to an external fluid exerting a pressure $P_o$, the differential piston 9 receives the pressure of the pressure communicating fluid on the large end face A of the first large piston portion 9a and the outside fluid pressure $P_o$ on the small end face B of the second small piston portion 9b. Therefore, suitable selection of the ratio of areas of each of the end faces A and B of the differential piston 9 will result in a reduced pressure on the large end face A as exerted by the pressure communicating fluid. This pressure reduction though variable with the outside pressure $P_o$ will be at a fixed rate as governed by the ratio of areas of the end faces A and B. Further, the reduced pressure exerted on the pressure communicating fluid, as determined above, will be applied to the volume interposed between the annular sealing means 5a and 6a on the engaging face of the cover plate 2 so that the annular sealing means 5a and 6a only have to bear the excess of the internal $P_i$ and external $P_o$ pressures, respectively, applied to their opposite sides. If it is assumed for the purposes of explanation that the ratio of the areas of the end faces A and B of the piston 9 is $P_o$: $(P_o+P_i)/(2)$, the pressure $P_o$ exerted by the pressure communicating fluid will be $(P_o+P_i)/(2)$. The net pressure borne by the annular sealing means 5a and 6a will then be $(P_o+P_i)/(2)$. Thus it will be seen that the pressure borne by each annular sealing means 5a and 6a is bisected under the exemplary conditions set forth above and the individual sealing means included within the sealing apparatus of the instant invention are subjected to only one-half the pressure exerted.

In actuality, there are many instances where the internal pressure P$i$ of the vessel may be regarded as zero. In such cases, if the area ratio, A:B, is two to one, the pressure borne by each annular sealing means will be one-half of the external pressure exerted P$o$/2. The solid line P at the upper portion of the figure depicts the pressure distribution produced under such conditions on the engaging face extending from the inside to the outside of the pressureproof vessel 1. The dotted line P' is indicative of the pressure distribution observed in conventional systems where no pressure dispersing means are provided. Thus, it will be seen that sealing apparatus which disperses the pressure applied to each sealing means therein has been provided by the exemplary embodiment of this invention depicted in the drawing.

In the above-described sealing apparatus according to the present invention, the pressure P$g$ of the pressure communicating fluid acts as a backup pressure for the annular sealing means 6$a$ on the high-pressure side so that, in high-pressure systems, there is no tendency for the O-ring on the high-pressure side to be forced out of its U-shaped channel to a position between the engaging surfaces. Such pressure relocation of the annular sealing means was a substantial deficiency found in prior art systems with deficiency has been substantially overcome by the sealing apparatus according to the present invention. Further, the sealing apparatus according to the present invention markedly increases the effectiveness of the sealed relationship obtained due to the pressure distribution inherent in its operation. In addition, the life of the sealing apparatus of the instant invention and hence the life of the devices using such apparatus is substantially increased because of the substantial reduction in the amount of pressure borne by each seal. Finally, the high finishing tolerances usually required in prior art devices using conventional sealing systems have been substantially reduced due to the ability of the sealing apparatus of the instant invention to distribute the applied pressure load; hence a multitude of manufacturing advantages are enjoyed when apparatus according to the instant invention is employed.

Although a relatively simple cutaway form of the invention disclosed herein has been adopted as the illustrative embodiment relied upon for the purposes of explanation, it should be realized that the precise form of the sealing apparatus according to the present invention will vary depending upon the devices with which it is used, manufacturing preferences exercised, and a wide range of modifications which will be obvious to those of ordinary skill in the art. For instance, the sealing apparatus according to the instant invention will usually include, as indicated in the drawing, a plurality of differential piston and cylinder means spaced over the periphery of the vessel to thereby enhance the pressure dispersing effect. The choice of the selected number of those used would naturally vary according to the size of the vessel, the finishing precision of the engaging surfaces, as well as many other factors. Also, if more than two annular seals were used, for instance in high-pressure systems, pressure dispersing differential piston and cylinder means may be provided at intervals of more than two sealing means so that the pressure load is distributed equally among all of the seals. In such a system, for example where two differential piston and cylinder means are used with three annular sealing means and one differential piston and cylinder means is positioned between adjacent sealing means, pressure could be equally distributed, assuming the internal pressure was zero, by setting the area ratio of the high-pressure side differential piston at three to two and the area ratio of the low-pressure side differential piston at two to one. Furthermore, although the differential piston and cylinder means in the described embodiment was located in the same body on which the annular sealing means were located, it should be apparent that said differential piston and cylinder means could be located with equal facility on any body or bodies which effectively communicate with both the external pressure producing fluid and the engaging surface.

While the invention has been described in connection with a specific embodiment thereof, it will be understood that many modifications will be readily apparent to one of the ordinary skill in the art, and that this application is intended to cover any adaptations or variations thereof. Therefore, it is manifestly intended that this invention be only limited by the claims and the equivalents thereof.

What we claim is:

1. Sealing apparatus comprising:
   a first body and a second body;
   a plurality of sealing means interposed between engaging surfaces of said first body and said second body, said plurality of sealing means including at least two sealing means having a volume interposed therebetween; and
   means including differential piston means disposed in cylinder means located in said first body for applying a pressure to said volume, said applied pressure being reduced from the pressure of the external environment.

2. The apparatus of claim 1, wherein said volume is filled with a pressure transmitting fluid, said pressure transmitting fluid upon the application of a reduced pressure thereto acting to transmit said reduced pressure throughout said volume and to said at least two sealing means.

3. The apparatus of claim 2, wherein said means for applying a reduced pressure to said volume includes a plurality of discrete piston and cylinder means spaced about said engaging surfaces between said at least two sealing means.

4. The apparatus of claim 1, wherein said cylinder means comprises a cylindrical opening communicating with said volume at a first end thereof and communicating with said external environment at a second end thereof.

5. The apparatus of claim 4, wherein said cylindrical opening includes an annular shoulder therein, said annular should effectively reducing the diameter of a portion of the bore of said cylindrical opening, said differential piston means including first and second diameter portions, said first portion of said differential piston means being substantially larger in diameter than said second portion.

6. The apparatus of claim 5, wherein said second portion of said differential piston means is mounted in the reduced diameter portion of said bore and includes an end face in fluid communication with said external environment.

7. The apparatus of claim 6, wherein said first portion of said differential piston means is mounted in an unreduced diameter portion of said bore and includes an end face in fluid communication with said volume.

8. The apparatus of claim 7, wherein said volume is filled with a pressure transmitting fluid, said pressure transmitting fluid upon the application of a reduced pressure thereto acting to transmit said reduced pressure throughout said volume and to said at least two sealing means.

9. The apparatus of claim 8, wherein piston rings are mounted on said differential piston to protect said pressure transmitting fluid from contamination by said external environment.

10. The apparatus of claim 8, wherein the ratio of areas of the end faces of said first and second portions of said differential piston means is determinative of the rate of pressure reduction achieved by said means for applying pressure to said volume.

11. The apparatus of claim 10, wherein coil spring means are provided in a portion of said volume as an assembling positioning means for said differential piston means.

12. The apparatus of claim 10, wherein the ratio of areas of the end faces of said first and second portions of said differential piston means is two to one.